(12) United States Patent
St-Jean et al.

(10) Patent No.: US 11,544,484 B2
(45) Date of Patent: Jan. 3, 2023

(54) IN-TRANSIT ITEM IDENTIFICATION SYSTEM FOR OVERHEAD CONVEYOR

(71) Applicant: Planiform Conveyors Inc., Terrebonne (CA)

(72) Inventors: Gabriel St-Jean, Lorraine (CA); Dany Bouchard, Terrebonne (CA); Dominic Gosselin, Mascouche (CA); Christophe Boisclair, St-Roch-de-l'Achigan (CA); Francis Fortier, St-Eustache (CA); Charles D'Amours-Lavoie, Terrebonne (CA)

(*) Notice: Subject to any disclaimer, the term of this patent is extended or adjusted under 35 U.S.C. 154(b) by 53 days.

(21) Appl. No.: 17/335,454

(22) Filed: Jun. 1, 2021

(65) Prior Publication Data
US 2022/0383008 A1    Dec. 1, 2022

(51) Int. Cl.
| | | |
|---|---|---|
| *G06K 7/10* | (2006.01) | |
| *G06K 19/07* | (2006.01) | |
| *G06K 19/077* | (2006.01) | |

(52) U.S. Cl.
CPC ..... *G06K 7/10445* (2013.01); *G06K 7/10099* (2013.01); *G06K 19/0723* (2013.01); *G06K 19/07773* (2013.01)

(58) Field of Classification Search
CPC .......... G06K 7/10445; G06K 7/10297; G06K 19/0725; G07C 9/27; G06F 16/1748; G01S 13/04; G01S 7/032; H04L 27/362; H04W 72/0413
See application file for complete search history.

(56) References Cited

U.S. PATENT DOCUMENTS

| | | | | |
|---|---|---|---|---|
| 2004/0070503 A1* | 4/2004 | Monahan | ............. | H01Q 1/2216 340/572.7 |
| 2005/0043854 A1* | 2/2005 | Dunlap | ............. | G06K 7/10346 700/215 |
| 2006/0226989 A1* | 10/2006 | Hillegass | ............. | H01Q 1/2241 340/572.7 |
| 2009/0303048 A1* | 12/2009 | Di Domenico | ........ | G06K 17/00 340/572.1 |
| 2017/0123057 A1* | 5/2017 | Prinz | ...................... | B65G 13/00 |

* cited by examiner

*Primary Examiner* — Vernal U Brown
(74) *Attorney, Agent, or Firm* — Benoit & Côté Inc.

(57) ABSTRACT

An in-transit identification system for an overhead conveyor that transports items equipped with radio frequency identification (RFID) tags uses a guide track arrangement and an antenna frame movably connected thereto. An RFID antenna is mounted to the frame and a bidirectional translation mechanism moves the frame relative to the guide track arrangement along a first direction parallel to a transport path of the conveyor and a second direction perpendicular to the first direction. A controller controls the translation mechanism to move the frame along the second direction to locate the antenna in the transport path adjacent to a first item being transported, along the first direction to maintain the antenna adjacent to said first item while an RFID tag of said first item is interrogated by the antenna and again along the second direction to withdraw the antenna from the transport path after interrogation of the RFID tag.

20 Claims, 5 Drawing Sheets

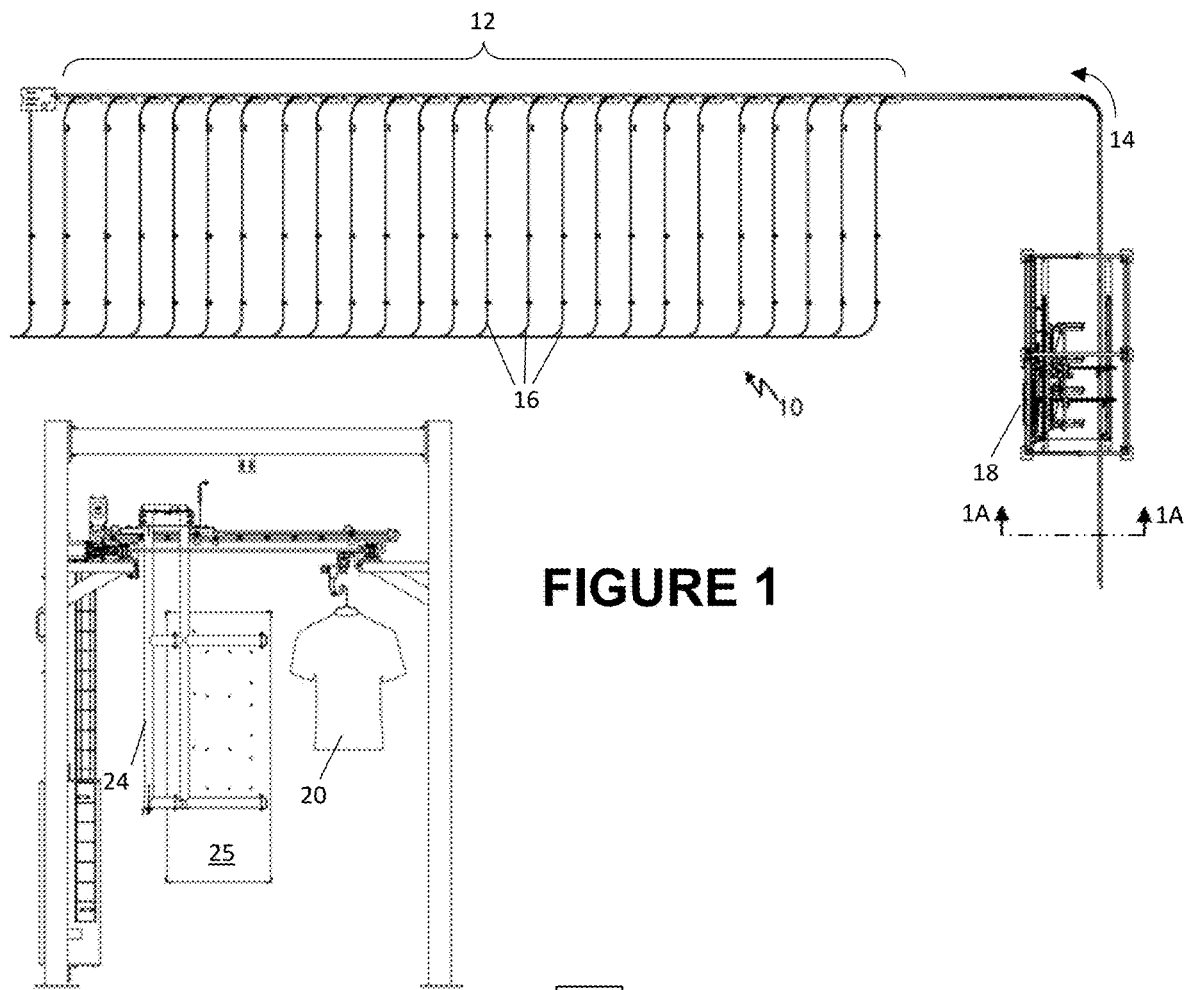
FIGURE 1
FIGURE 1A
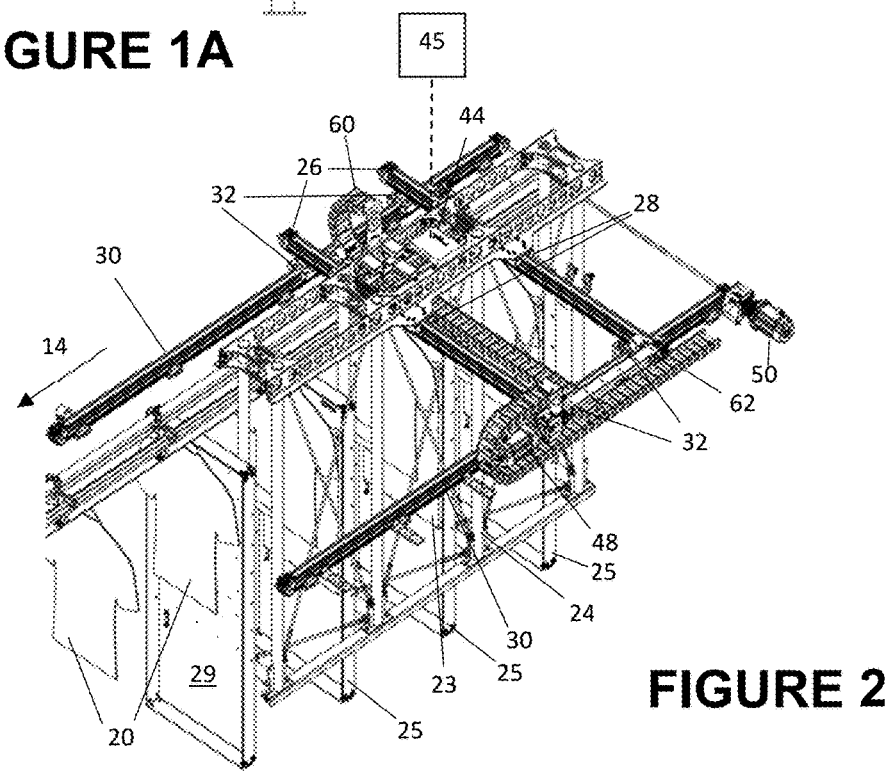
FIGURE 2

IN-TRANSIT ITEM IDENTIFICATION SYSTEM FOR OVERHEAD CONVEYOR

BACKGROUND OF THE INVENTION

Field of the Invention

This invention relates generally to the field of overhead conveyor systems and, more particularly, to identification of items transported in such systems.

Description of the Related Art

Conveyor systems are commonly used in business locales for which the storage and retrieval of a large number of items is necessary. One common usage of such conveyors is in the garment industry, in which garments, such as shirts, jackets or pants, are stored on hangers which are contacted and moved by the conveyor as a means to efficiently transport the garments to and from various storage locations. Typical overhead conveyors rely on an elevated track to which movable transport components are attached. A chain or cable that is secured to the track makes a closed loop and follows the track in one or two directions, driven by a motor. Transport components that are connected to the chain will be thereby guided along the track. By attaching a hanger carrying a garment to such a component, it may be used to guide the garment to a designated location by moving the transport component along the track.

In many conveyor systems, the items being transported are identified by radio frequency identification (RFID) tags that are attached thereto. These tags are typically scanned when the items are introduced to the system, and when they are removed. The tags may also be scanned by automated sorting components within the conveyor system that direct individual items to different locations within the conveyor network. Thus, the system maintains a record of what items are currently stored, and in what locations, as well as when they are introduced and removed from storage.

The initial scanning of an item when it is introduced to the system may be done manually, but this is quite time-consuming and labor intensive. More often it is done automatically, but depending on the system used, it may be relatively slow and occasionally disruptive to the flow of garments entering the system. Moreover, automatic scanning of RFID tags can be complicated by the close proximity of items to one another, and even other RFID tags in the vicinity, such as those worn by workers in the area. One prior art system, for example, uses an RFID scanning "tunnel" through which a single item passes at a time, and which isolates that item from other tags and RF signals in the area. However, to provide the necessary isolation, the items must be separated from one another by a relatively large distance, which significantly limits the speed at which items may be introduced to the system. Moreover, any aspect of the scanning that must be done manually, whether at an initial introduction of a garment to the system or for confirmation of the sorting of garments already in the system, is time-consuming and risks the introduction of human error into the system.

SUMMARY OF THE INVENTION

In accordance with the present invention, an in-transit identification system is provided for an overhead conveyor that transports items equipped with radio frequency (RFID) tags along a transport path. In an exemplary embodiment, the conveyor is a garment conveyor that transports garments suspended from the overhead conveyor by hangers. The system includes a guide track arrangement that is located adjacent to a portion of the conveyor transport path and an antenna frame that is movably connected to the guide track arrangement. At least one RFID antenna is mounted to the frame in an orientation substantially perpendicular to the transport path, the antenna being capable of interrogating an RFID tag when in proximity to it.

The antenna frame is connected to the guide track arrangement by a bidirectional translation mechanism that is operable to move the frame relative to the guide track arrangement along two directions: a first direction substantially parallel to the transport path; and a second direction substantially perpendicular to the transport path. The translation mechanism is controlled by a controller to move the antenna frame through a sequence that permits interrogation of the RFID tags of the items during transport. In particular, the frame is moved along the second direction to locate the antenna in the transport path adjacent to an item being transported, along the first direction to maintain the antenna adjacent to the item while the RFID tag of the item is interrogated by the antenna, and back along the second direction to withdraw the antenna from the transport path after the RFID tag is interrogated.

In an exemplary embodiment, the guide track arrangement includes a fixed guide rail parallel to the transport path and a movable guide rail that is perpendicular to the fixed guide rail. The antenna frame is connected to the movable guide rail, and the movable guide rail is connected to the fixed guide rail. The movable guide rail is movable along the first direction relative to the fixed guide rail by the translation mechanism, while maintaining its orientation perpendicular to the fixed guide rail. The translation mechanism may also be controlled to move the frame relative to the movable guide rail along the second direction. Thus, the translation mechanism may be operated to move the frame in two perpendicular directions, by moving the frame relative to the movable guide rail and by moving the movable guide rail relative to the fixed guide rail. The guide rail arrangement may also include multiple fixed guide rails and multiple movable guide rails that move in unison relative to the fixed guide rails.

In the exemplary embodiment, the translation mechanism is operated to move the frame repeatedly along a closed loop path. From a first position with the antenna outside of the transport path, the frame is moved along the second direction to a second position in which the antenna is in the transport path adjacent to an item. From the second position the frame is moved along the first direction to a third position while keeping the antenna adjacent to the item while the tag is interrogated. From the third position the frame is moved along the second direction to a fourth position in which the antenna is withdrawn from the transport path. Finally, from the fourth position the frame is moved along the first direction back to the first position, after which the movement sequence repeats to allow interrogation of the RFID tag of another item being transported.

In the exemplary embodiment, the translation mechanism includes at least one servomotor that is controlled by the controller, and may use multiple servomotors for effectuating movement of the frame along each of the first and second directions. The antenna frame may also use multiple antennas mounted to the frame. In one embodiment of the invention, multiple antennas are mounted to the frame and separated by a predetermined distance along the first direction. Movement of the frame along the second direction then locates the multiple antennas adjacent to different respective items, and the RFID tags of those items are interrogated simultaneously by the respective antennas. Multiple antennas may also be arranged in different regions of the frame such that they are located at different positions adjacent to the same item and used cooperatively to cover different possible locations of an RFID tag of an item. In the exemplary embodiment, nine antennas are used, organized in three different sensing zones, each of will be located adjacent to a different item during the interrogation process. Thus, the RFID tags of three different items may be detected simultaneously, using three antennas per item to provide coverage across a wide sensing zone.

The identification system may also make use of a RFID shield that blocks RFID signals from a side of the shield opposite the antenna. In one embodiment, one or more antennas are mounted to one side of a panel that comprises the RFID shield and that is oriented to block signals from RFID tags in an upstream position along the transport path. In another embodiment, an RFID shield is located to a side of an item being interrogated opposite the antenna, so as to block signals from RFID tags in a downstream position along the transport path.

In the exemplary embodiment, the signals collected by the antenna are analog signals that are transmitted to an RFID reader that determines from the analog signal a unique identifier associate with the interrogated tag. This information is transmitted to the controller, or to a separate data collection system, and used to compile a record of the items transported by the conveyor. This information may also be used to associate the RFID identifiers with other unique identifiers, such as bar codes or other identification means used with transport components, such as sorting clips to which the items are connected, respectively, for transport. The information may likewise be used with sorting algorithms or other desired data storage and/or processing tools.

BRIEF DESCRIPTION OF THE DRAWINGS

FIG. 1 is a top, schematic view of a portion of an overhead conveyor and an in-transit identification system according to the invention.

FIG. 1A is a schematic, cross-sectional view of a portion of the system shown in FIG. 1.

FIG. 2 is a schematic, perspective view of the identification system shown in FIG. 1.

DETAILED DESCRIPTION

Figure 3A:
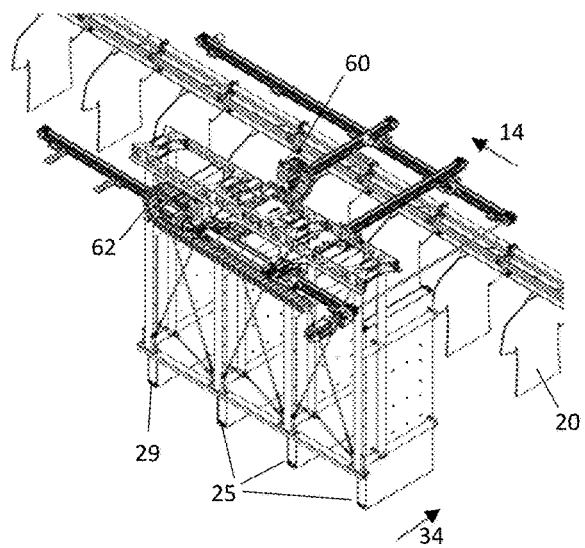
FIG. 3A is a schematic, perspective view of the identification system of FIG. 2 shown in a first operational position.

FIG. 1 is a top, schematic view of a portion of an overhead conveyor system 10 having a sorting section 12, along which items, such as garments, being transported in the direction of arrow 14 may be individually diverted to separate sorting/storage locations 16. In the exemplary embodiment, the sorting/storage locations 16 use a "slick rail" construction as is known in the art. Also shown in the figure is an in-transit identification system 18 for scanning the items introduced to the system prior to their arrival at the sorting/storage locations. Those skilled in the art will understand that the identification system 18, while typically used at an entry point to the system for initial garment identification, may also be used at any desired location in a conveyor system. As such, its association with a sorting system in FIG. 1 is only one example arrangement, since the ability to do real time identification of the items on the conveyor may have a variety of different applications.

A schematic front view of the identification system 18 is shown in FIG. 1A, which is an enlarged, cross-sectional view along the section line 1A-1A shown in FIG. 1. In the section of the conveyor that is encompassed by the identification system 18, RFID tags on garments, like shirt 20, that are being transported by the conveyor are scanned by a moving antenna arrangement. This antenna arrangement is mounted on panels 25 attached to a frame 24 that moves in two perpendicular directions, the direction of the moving garments (the "axial" direction), and the horizontal direction perpendicular thereto (the "lateral" direction). As the garments arrive at the identification system 18, the antenna arrangement is positioned near the front of the system, and moves laterally to insert the antenna panels 25 attached to the frame 24 into the spaces separating the moving garments. The antenna arrangement then moves axially with the garments while it interrogates the adjacent RFID tags, collecting the identifying information stored therein. Before reaching the rear end of the identification system, the antennas are withdrawn in the opposite lateral direction, and return in the opposite axial direction to the front of the identification system, where they are inserted in the lateral direction into the spaces between the next garments being transported by the conveyor.

The geometric arrangement of the identification system components is shown in the schematic, perspective view of FIG. 2. As garments move along the direction of arrow 14, antenna modules located in antenna housings 23 are moved in unison in the axial and lateral directions. Although the present embodiment uses three antenna modules per housing 23, those skilled in the art will understand that different numbers, combinations and arrangements of antennas may be used without departing from the principles of the invention. In the embodiment shown, the antenna modules are arranged vertically within each respective housing, such that they are within range to detect RFID signals from tags that may be located at different vertical positions on different garments. The antenna modules interrogate RFID tags on the transported garments and transmit the collected analog signals to RFID reader 44 via electrical conductors secured to the frame. The reader 44 identifies specific codes and transmits the corresponding identifying information to a controller 45 via a communication network. The communication network may be any of a number of different known network types, such as a hardwired network (e.g., ethernet) or a wireless network, and is therefore shown in FIG. 2 as a broken line connection between the reader 44 and the controller 45.

Each antenna housing 23 is attached to a corresponding panel 25 that, in addition to supporting the housing 23, functions as an RFID shield to block interfering signals from other garments or other nearby sources. In the exemplary embodiment, the panels are constructed of aluminum, although any other material capable of shielding the antennas from extraneous signals may also be used. The panels 25 are mounted via frame 24 to two lateral rails 26 via carriages 28. The carriages 28 are movable along the lateral rails 26, the motion being provided by a first servomotor 48 (the "lateral servomotor"), which is controlled to move the carriages 28 (and thus the frame 24) back and forth in the lateral direction. The lateral rails 26 are, in turn, movably mounted on two axial rails 30 by carriages 32. Axial movement of the lateral rails is provided by a second servomotor 50 (the "axial servomotor"), which is controlled to move the rails 26, and therefore the frame 24 and antenna housings 23, back and forth in the axial direction.

In the present embodiment, a front shield 29 is also provided that is parallel to the panels 25, but does not have an antenna housing mounted to it. The front shield 29 is downstream of the panels 25 relative to the axial movement of the garments, and shields the antenna housings 23 behind it from downstream radio signals that might interfere with antenna operation. Like the panels 25, the front shield 29 is mounted directly to the frame 24, and moves with the panels 25, being inserted between garments in the same sequence as the panels 25. Those skilled in the art will understand that the front shield 29 is an optional feature that is advantageous, but not absolutely necessary, for operation of the invention.

Figure 3B:
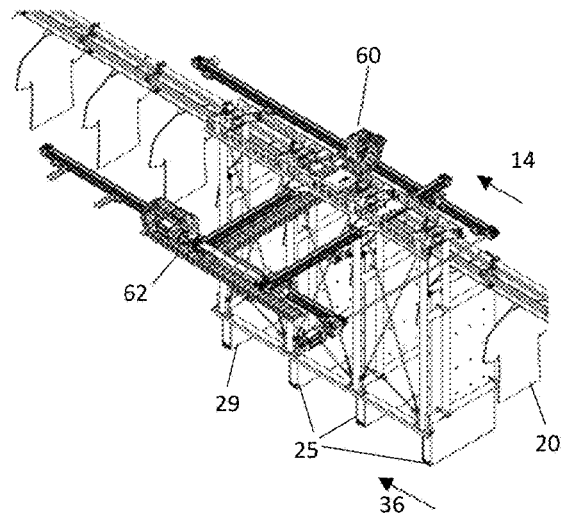
FIG. 3B is a schematic, perspective view of the identification system of FIG. 2 shown in a second operational position.

Movement of the panels 25 of the identification system 18 is depicted in FIGS. 3A-3D, each of which shows the panels 25 in a different position during the identification process. In FIG. 3A, the panels 25 and front shield 29 are at a starting position at the front of the identification system, and are being moved laterally in the direction of arrow 34 to position them in spaces separating five consecutive garments on the conveyor. This lateral motion is provided by the lateral servomotor, which stops once the antenna housings are properly positioned next to the garments 20 to be identified. During this time, as shown in FIG. 3B, the axial servomotor is moving the assembly in the direction of arrow 36, matching the speed of the garment conveyor so that relative axial positions of the antenna housings 23 and the garments 20 do not change. With the antenna housings 23 properly positioned, the RFID tags of the garments 20 are interrogated by the antennas in the housings to collect the necessary identifying information while continuing unimpeded in the axial direction of the conveyor.

Figure 3C:
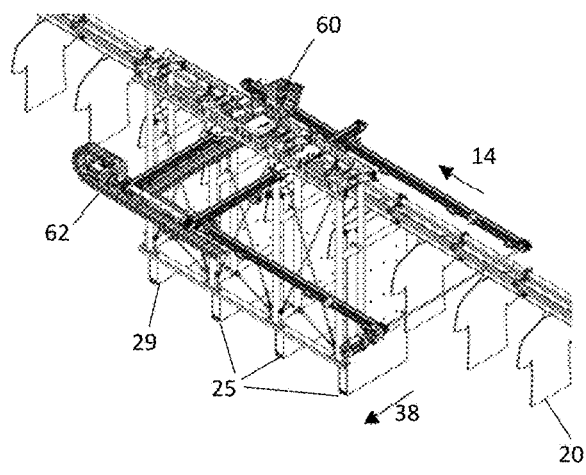
FIG. 3C is a schematic, perspective view of the identification system of FIG. 2 shown in a third operational position.
Figure 3D:
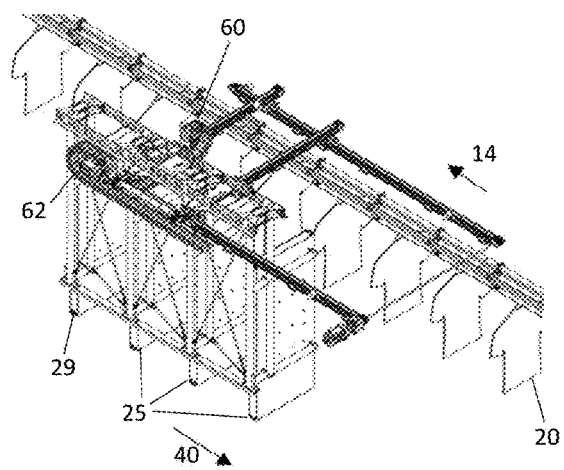
FIG. 3D is a schematic, perspective view of the identification system of FIG. 2 shown in a fourth operational position.

Once the assembly approaches the end of the identification system, it is moved back in the opposite lateral direction shown by arrow 38 in FIG. 3C, thereby withdrawing the antenna housings 23 from the spaces between the garments. This movement is provided by the lateral servomotor and, once the panels 25 and front shield 29 are clear of the garments, the axial servomotor is reversed to move the assembly back toward the front of the identification system, i.e., in the direction shown by arrow 40 of FIG. 3D. Once returned to the front of the identification system, the panels 25 are again moved in the direction shown in FIG. 3A, and the identification process recommences with the next three garments.

Figure 4:
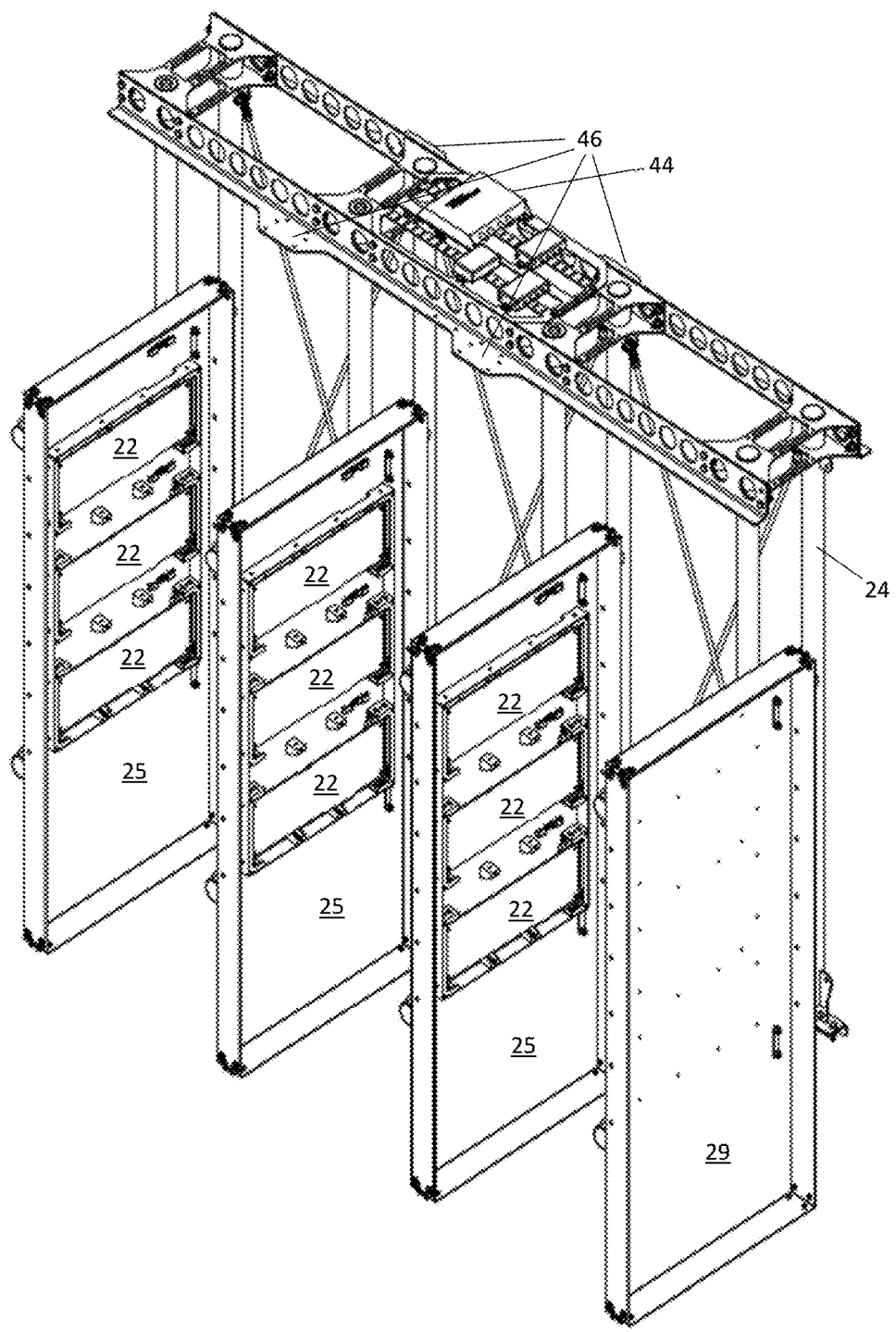
FIG. 4 is a schematic, perspective view of the antenna frame of the identification system of FIG. 2.

The panels 25 and front shield 29 of the identification system 18 are shown in more detail in FIG. 4. Within each antenna housing 23 are mounted three antenna modules 22 that are separated vertically from one another, although those skilled in the art will recognize that other combinations and positionings of antenna modules may also be used. In the exemplary embodiment, there is a cover over the antenna modules 22 to prevent contact between them and the garments on the conveyor, but the cover is omitted in FIG. 4. The antenna modules 22 of each housing 23 establish an interrogation zone over which the antennas are capable of interrogating an RFID tag on an adjacent garment 20. Thus, a tag may be located in one of several different regions of a garment while remaining detectable to the antenna system. Each of the antenna modules 22 in this embodiment has a rectangular profile that approximately covers the width of its respective housing 25. Antennas of this nature are known in the art, and the specific design will therefore not be discussed herein in any more detail.

In the present embodiment, the antenna modules 22 are connected by signal wires to the reader 44, which moves with the antenna assembly. In the present embodiment, the reader 44 is connected to the communication network via ethernet cable although, as mentioned above, other types of signal connections may also be used. The cabling between the various system components is protected by cable carriers 60, 62 as shown, for example, in FIG. 2.

Figure 5:
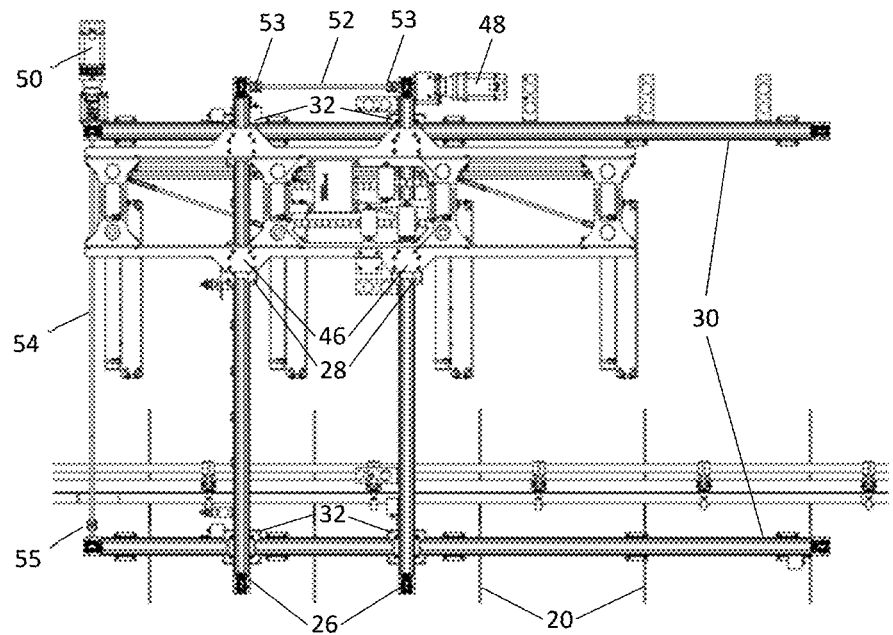
FIG. 5 is a schematic, top view of the identification system of FIG. 2.

FIG. 5 is a top view of the system showing mounting brackets 46 of the frame 24, which connect to the carriages 28 that are moved, respectively, along the lateral rails 26. Each of the axial rails 30 has two carriages 32, each attached to a different one of the two lateral rails 26. The carriages of both the lateral and axial rails are slidably mounted to their respective rails, and each is moved by a drive belt to which it is attached. In the exemplary embodiment, the drive belts reside within their respective rails to protect them from external contact, and are mounted on pulleys located at opposite ends of the rails. A drive pulley receives rotational energy from the servomotor, while an idler pulley at the opposite end of the respective rail rotates freely and provides support for the belt. Lateral drive belts associated, respectively, with each of the lateral rails 26 are controlled to move the frame 24 back and forth along the rails in which they reside, while axial drive belts residing in the axial rails 30 are used to move the lateral rails 26 back and forth along the axial rails 30. The lateral drive belts are driven by lateral servomotor 48, and the axial drive belts are driven by axial servomotor 50.

Figure 6:
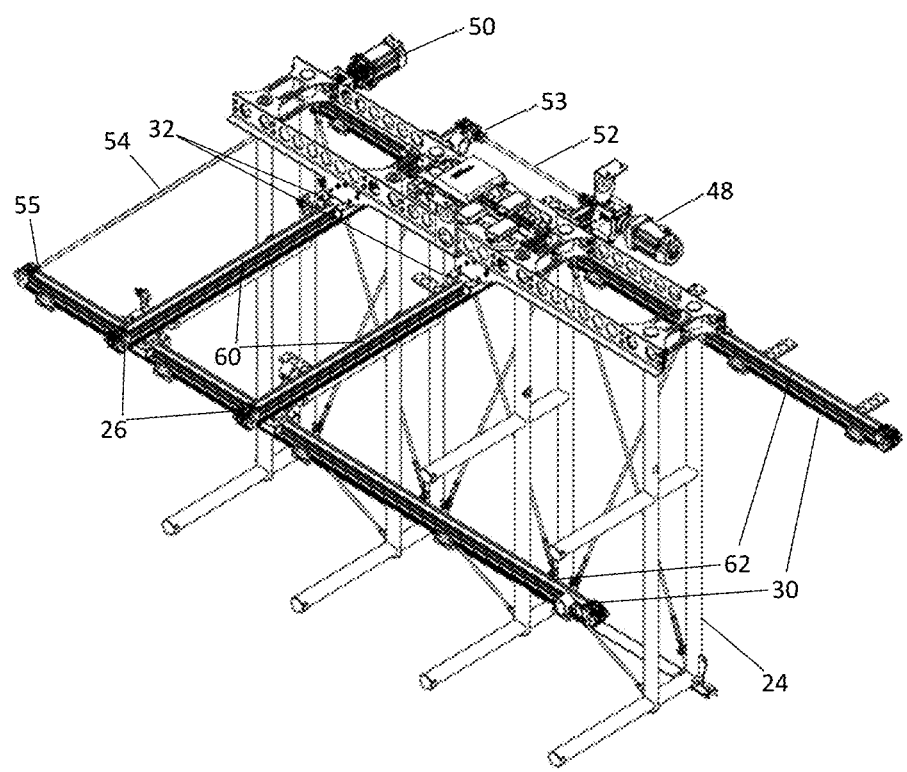
FIG. 6 is a partial, perspective view of the identification system of FIG. 2.

As shown in FIG. 6, the servomotor 48 is mounted adjacent to a first of the two lateral rails 26, and a proximal end of a drive shaft 52 is connected to and rotates with the servomotor 48. The drive shaft extends from its proximal end toward the more distant lateral rail, and engages rotatable couplings 53 associated with each of the rails 26. The coupling 53 of each rail 26 transfers the rotation of the drive shaft 52 to a drive pulley in that rail that drives the movement of the belt located therein. Similarly, the servomotor 50 has a drive shaft 54 that extends from its proximal end at the servomotor 50 to its distal end, and that is connected to rotatable couplings 55 associated with each axial rail 30. The couplings 55 transfer the rotation of the drive shaft 54 to the drive pulleys of the rails 30 to provide movement of the belts located therein.

In FIG. 6, the cable carriers 60, 62 are not shown, so as to not obstruct the other features of the drawing. The belts in the rails 26, 30 are also hidden from view although those skilled in the art will understand that each drive belt extends from one end to an opposite end of each rail, and is driven by a toothed pulley attached to its respective servomotor. Such belt and pulley systems are well known in the art, and are therefore not described in detail herein.

As shown in FIG. 6, the lateral rails 26 are moved together in unison, as their respective carriages 32 slide along the axial rails 30 in response to movement of the belts located therein upon activation of servomotor 50. Thus, rotation of the servomotor 48 in a first direction causes the frame 24, and therefore the panels attached to it, to move toward the garments, while rotation in the opposite direction causes it to move away from the garments. Similarly, rotation of the servomotor 50 in a first direction causes the lateral rails 26, and therefore the frame 24, to move in the same direction as the transported garments, while rotation in the opposite direction causes the lateral rails 26, and therefore the frame 24, to move in the opposite direction as the garments.

When doing an in-transit identification of items according to the invention, a transport clip from which a garment hanger is suspended is first identified. In the present embodiment, the scanning of a barcode on the clip provides the initial identification, which establishes a "clip ID" which must then be associated with an identifier for the item on the hanger suspended from that clip, i.e., the "item ID." Since there are a finite number of clips that are monitored throughout the system, each with a unique identifier via its barcode, the position of each clip in the system is known at any point in time. The garments are suspended from the hangers which, in turn, are suspended from the clips and, as in prior art systems, sensors are used in the sorting system that detect hangers suspended from the clips. This allows the system to track the location of a hanger suspended from a particular clip. With the present invention, unique identification of a garment on a hanger can be detected and then associated with a particular clip.

During operation of the identification system 18, the clips/hangers with suspended garments arrive at the location of the identification system 18. In the present embodiment, three garments are identified at a time. Upon arrival, the three garments are scanned by the antennas of the three antenna housings 23, as described above and shown in the sequence of FIGS. 3A to 3D. Upon insertion of the panels 25 into spaces adjacent to the three garments, as shown in FIG. 3B, the antenna modules 22 start interrogating the RFID tags of the garments, each set of antennas pulsing an interrogation signal and detecting the return signal from the respective adjacent garments. These return signals are transmitted to the reader 44, which identifies the corresponding item IDs embedded in the signals, and forwards them to the controller 45, which then associates each item ID with the clip ID of the clip to which the garment is attached. The process then continues with the next three clips/garments arriving at the identification system 18. This information is then used with a sorting algorithm of the overall garment storage system to route each garment to the appropriate location, or for whatever other application the identification system may be used for.

Figure 7:
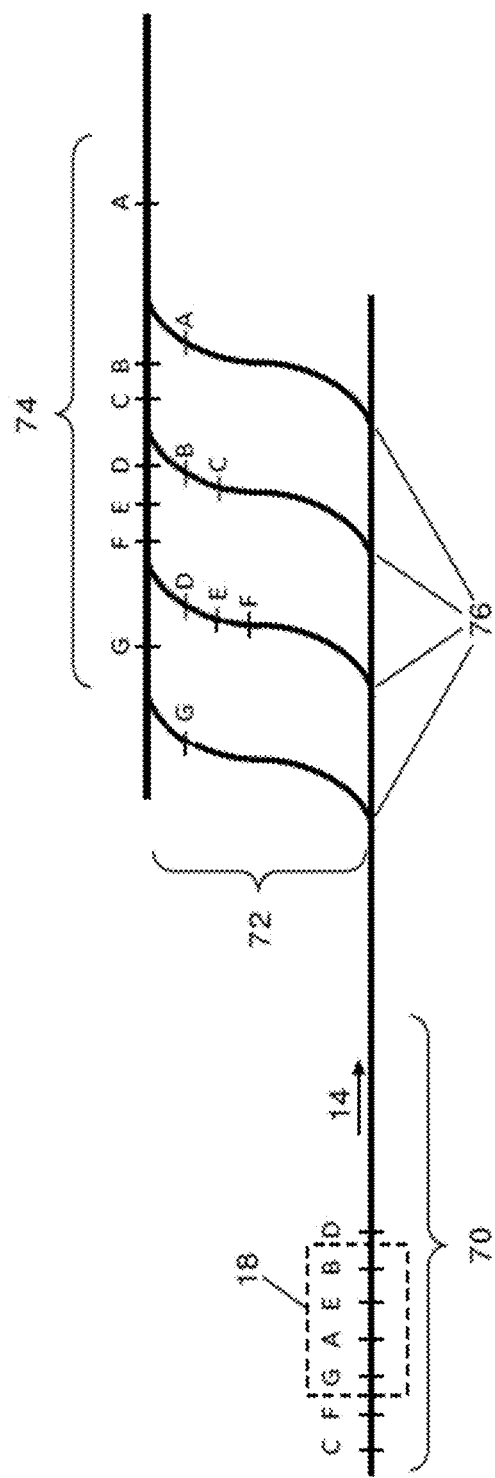
FIG. 7 is a schematic diagram of a garment sorting system that uses an identification system according to the present invention.

FIG. 7 is a schematic diagram showing how the identification system of the present invention may be used as part of a garment sorting system. The heavy, solid lines of the diagram indicate paths along which the garments travel, with three general sections of the system being identified by the bracket indicators 70, 72 and 74. Individual garments are indicated by different letters to allow the manner in which the garments are sorted to be understood. In an identification section 70, the garments arrive along a conveyor on hangers suspended from transport clips each having a unique clip ID, as discussed above. The identification system 18 of the invention, shown in the figure by a broken line, then reads the RFID tag of each garment, allowing the item ID for a garment to be associated with the clip ID of its associated transport clip. In this way, the order of the garments being transported by the conveyor is known, as they proceed through the system in the direction shown by arrow 14.

In sorting section 72, the garments are separated onto different branches at a series of ejection points 76. Each ejection point uses a conveyor diverter controlled by the system controller to redirect garments, with their associated hangers, onto a secondary path according to a desired sorting algorithm. Diverters of this type are known in the art, and are therefore not described in detail herein. By using multiple secondary paths, the order of the garments may be rearranged such that, when they are output in the recombination section 74 of the system, they are in the rearranged order. The diagram shown in FIG. 7 uses four secondary paths, but those skilled in the art will understand that a system may use more or fewer as appropriate. The sorted garments may then be moved along the recombination section 74 as desired. In the present embodiment, the secondary paths 72 and the recombination section 74 are not conveyor sections but, rather, passive rail structures (such as "slick rail") along which the garments may be manually moved. In such a case, the transport clips typically remain on the conveyor, the garments being removed therefrom such that only the hangers pass to the secondary paths. However, it will be understood by those skilled in the art that other uses of the identification system may include transferring the garments (and clips) to other powered conveyor sections.

While the invention has been shown and described with reference to an exemplary embodiment thereof, those skilled in the art will recognize that various changes in form and detail may be made therein without departing from the scope of the invention as defined by the appended claims.

The invention claimed is:

1. An in-transit identification system for an overhead conveyor that transports items equipped with radio frequency identification (RFID) tags along a transport path, the system comprising:
   a guide track arrangement located adjacent to a portion of the conveyor transport path;
   an antenna frame that is movably connectable to the guide track arrangement;
   an RFID antenna that is mounted to the frame and that is capable of interrogating an RFID tag when in proximity thereto;
   a bidirectional translation mechanism that connects the frame to the guide track arrangement, and that is operable to move the frame relative to the guide track arrangement along a first direction substantially parallel to the transport path and along a second direction substantially perpendicular to the transport path; and
   a controller that controls the translation mechanism to move the frame along the second direction to locate the antenna in the transport path adjacent to a first item being transported, to move the frame along the first direction to maintain the antenna adjacent to said first item while an RFID tag of said first item is interrogated by the antenna and to move the frame along the second direction to withdraw the antenna from the transport path after the RFID tag of said first item is interrogated.

2. A system according to claim 1 wherein the guide track arrangement comprises a fixed guide rail parallel to the transport path to which is connected a movable guide rail perpendicular to the fixed guide rail to which the frame is connected, the movable guide rail being movable by the translation mechanism in said first direction.

3. A system according to claim 2 wherein the frame is movable by the translation mechanism relative to the movable guide rail in said second direction.

4. A system according to claim 1 wherein the translation mechanism comprises at least one servomotor that is controlled by the controller to effectuate movement of the frame.

5. A system according to claim 1 wherein the antenna is a first antenna, and wherein the system comprises a plurality of antennas mounted to the frame.

6. A system according to claim 5 wherein said plurality of antennas simultaneously interrogates RFID tags of a plurality of items being transported.

7. A system according to claim 5 wherein said plurality of antennas comprises more than one antenna arranged to interrogate a single RFID tag.

8. A system according to claim 5 wherein said plurality of antennas are mounted to the frame at different positions along the first direction, and movement of the frame along the second direction results in said plurality of antennas being located adjacent to a plurality of different respective items being transported such that, while moving the frame along the first direction, an RFID tag of each of said different respective items is interrogated by a different one of the plurality of antennas.

9. A system according to claim 1 wherein the translation mechanism moves the frame repeatedly along a closed loop path.

10. A system according to claim 1 wherein the items being transported are garments on hangers.

11. A system according to claim 1 further comprising an RFID shield adjacent to the RFID antenna that blocks RFID signals from a side of the shield opposite the antenna.

12. A system according to claim 1 further comprising an RFID shield located to a side of the first item opposite the antenna that blocks RFID signals other than a signal from the RFID tag from reaching the antenna.

13. A system according to claim 1 further comprising an RFID reader to which signals collected by the antenna are directed and which determines from said signals a unique identifier associated with each tag.

14. A method for the in-transit identification of items transported by an overhead conveyor and equipped with radio frequency identification (RFID) tags, the system comprising:

locating a guide track arrangement adjacent to a portion of the conveyor transport path, the guide track arrangement having an antenna frame that is movably connected thereto and that includes an RFID antenna that is capable of interrogating an RFID tag when in proximity thereto;

moving the frame relative to the guide track along a first direction substantially parallel to the transport path and along a second direction substantially perpendicular to the transport path using a bidirectional translation mechanism that connects the frame to the guide track arrangement; and controlling the translation mechanism to move the frame along the second direction to locate the antenna in the transport path adjacent to a first item being transported, to move the frame along the first direction to maintain the antenna adjacent to said first item while an RFID tag of said first item is interrogated by the antenna and to move the frame along the second direction to withdraw the antenna from the transport path after the RFID tag of said first item is interrogated.

15. A method according to claim 14 wherein the antenna is a first antenna, and wherein the antenna frame includes a plurality of antennas mounted thereto.

16. A method according to claim 15 wherein the plurality of antennas simultaneously interrogates RFID tags of a plurality of items being transported.

17. A method according to claim 14 wherein controlling the translation mechanism to move the frame comprises controlling the translation mechanism to move the frame repeatedly along a closed loop path.

18. A method according to claim 14 wherein the items being transported are garments suspended from the overhead conveyor by hangers.

19. A method according to claim 14 further comprising shielding the antenna from RFID signals other than a signal from the RFID tag being interrogated.

20. A method according to claim 14 further comprising using an RFID reader to determine from said signals a unique identifier associated with each tag.

* * * * *